Patented Apr. 8, 1924.

1,490,021

UNITED STATES PATENT OFFICE.

ALEXANDRE PEDEMONTE, OF TOULON, FRANCE.

MANUFACTURE OF ALUMINUM CHLORIDE AND PURE ALUMINA.

No Drawing.         Application filed May 13, 1922. Serial No. 560,746.

*To all whom it may concern:*

Be it known that I, ALEXANDRE PEDEMONTE, a citizen of the Republic of France, and resident of Toulon, in the Republic of France, have invented certain new and useful Improvements in the Manufacture of Aluminum Chloride and Pure Alumina, of which the following is a specification.

Natural bauxite is a mineral of aluminum in which such metal is present mainly in the form of alumina having two molecules of crystallization water, that is soluble alumina, and this process takes advantage of such solubility for extracting it in a state of purity.

However bauxite always contains peroxide of iron, silica and titanic oxide and it is first necessary to free it from these.

The separation of iron is the preliminary operation.

After drying the bauxite at 100° C. to eliminate the water, impregnating the earths and carbonizing the traces of organic matters, bauxite is pulverized and sieved (a sieve of at least 300 mesh); it is then acted upon in agitating vats with a sufficiency of hydrochloric acid diluted to the density of 1.10.

All the peroxide of iron is acted upon as well as a portion of the silica. The solution of the chlorides is filtered and there remains on the filter a white mass composed almost entirely of pure alumina with a small remainder of silica (and titanic oxide). After washing and desiccation the mass is acted upon with the necessary quantity of sulphuric acid of 42° Bé. (density 1.41). Such acid has the property of dissolving all the alumina and of allowing the remainder of the silica and it may be titanic oxide to remain undissolved.

After completion of the reaction the mass is diluted and brought to boiling. Silicic acid and titanic acid then precipitate in white flakes.

These latter are separated by filtration, the filtrate being a solution of pure and very white aluminum sulphate which may be crystallized.

These may to obtain commercially pure alumina if desired be chemically decomposed by known means especially with sodium carbonate or by calcination.

When the main commercial result aimed at is pure alumina it is better to avoid the production of the sulphate by the following means which is a great simplification of the process.

After the previous removal of any iron peroxide which may be present in the bauxite by the aid of dilute hydrochloric acid the residual mass composed of alumina, silica and titanium, is calcined to a dull red heat in a suitable furnace.

This operation only dehydrates the alumina in part while the silica and titanic acid are completely dehydrated and become anhydrous.

In this new state silicic anhydride and titanic anhydride are completely insoluble in concentrated or dilute hydrochloric acid while the alumina remains soluble in fuming hydrochloric acid by digesting it hot for a sufficient length of time.

In this new treatment separation is therefore complete.

By filtration there is obtained on the filter a mixture of silica and titanium while the solution of aluminum chloride obtained is evaporated, then calcined at a high temperature so dissociating it into anhydrous alumina $Al_2O_3$ and gaseous HCl which is recovered by known means.

It may happen that the peroxide of iron $Fe_2O_3$ is present in the natural bauxite not in the usual amorphous state but in the crystalline state (oligist ore). These crystals are very refractory to acid attack and in this case this oxide must be transformed before it is attempted to remove the iron.

1. The mineral, before any hydrochloric acid treatment, may be treated in the calcining furnace for the silica and the titanic acid previously set out. Preferably the furnace is a rotating furnace tube which by the regulation of the air is given a reducing atmosphere and is maintained at an incipient red heat.

The iron by contact with carbon monoxide at a red heat passes into a lower state of oxidation and the red crystals lose their colour and hardness. They are then easily soluble in dilute acids.

2. Removal of iron: On passing out of the reducing furnace the material is methodically leached in several vats with a dilute acid for the removal of the iron either with or without heat. The operation may be effected at any temperature and with different acids.

3. Chlorination of the alumina: After air drying the solid leach material consisting of alumina, silica and titanic acid is treated as in the previous case either at atmospheric pressure or under pressure and with heat with concentrated hydrochloric acid which dissolves the alumina only, the silicic and titanic anhydrides being insoluble at this stage.

The other subsequent operations, that is drying and dissociation of the solution of aluminum chloride with recovery of hydrochloric acid, remain the same.

According to the physical state of the components however it is not absolutely necessary to follow the sequence of the operations; this order is merely by way of illustration and not as a limitation.

If the preliminary removal of the iron is ineffective or incomplete for any reason, the operation may after the heating already described be rendered complete in the following manner, or the process to be described as a means for the complete removal of the iron may be adopted at the commencement.

The mineral impregnated with ferric oxide is placed in a suitable closed vessel together with the quantity of hydrochloric acid corresponding exactly to the formula $Al_2O_3+6HCl$ and the contents heated to above 100° C. Ferric chloride is first produced and little by little hydrated aluminum chloride.

As indicated however by the principles of thermochemistry the reaction mass tends towards the system which gives out most heat, that is aluminum chloride; on the other hand at the temperature of operation ferric chloride which is first formed becomes dissociated into $Fe_2O_3$ and free HCl and cannot again be produced so long as the temperature is maintained high.

At the end of the operation when there is no more free HCl the only salt in solution is aluminum chloride. Precipitated ferric oxide is separated by filtration and this is found mixed with silica and with residual and insoluble titanic acid.

Pure alumina is then obtained as above described.

This operation is effected, but not so well, with sulphuric solutions as these latter dissolve titanium which only deposits very slowly and further the product of the dissociation of the ferric sulphate is a ferric oxide having a high content of insoluble basic ferric sulphate (ferroso-ferric sulphate).

It will very clearly be seen that the process is based upon the following principle:

By suitable means the components of the bauxite are brought to a state such that there is a possibility of chemically or mechanically separating them while advantage is taken of the solubility of the alumina in an acid for extracting it in a state of purity.

The improvement thereafter consists of one of these means: When in order to facilitate the preliminary treatment of ferruginous bauxite these latter are placed in the reducing atmosphere of a furnace it is allowable and even advantageous to allow the reduction to take place for a period of time sufficient for the reducible oxides of iron and titanium to be brought to a metallic state. It is known that in this case silica and alumina remain unchanged.

The products of reduction, i. e. iron and titanium, are magnetic metals which can then easily and completely be removed by magnetic separation with the known aid of an electromagnet.

The reduction may also be effected at low temperatures, that is between 350° and 440° C. for Moissan has shown that in this case magnetic oxide of iron ($Fe_3O_4=FeO_2O_3$) is obtained which is easily separable magnetically.

Under these conditions titanic acid is also sufficiently reduced to become acted on by magnetic separation, traces of it which remain being afterwards precipitated by boiling the acid solution produced at a later stage for a sufficient length of time.

Having now particularly described and ascertained the nature of my said invention and in what manner the same is to be performed, I declare that what I claim is:

1. In the herein described process, the steps which consist in calcining bauxite, and subsequently digesting with fuming hydrochloric acid.

2. The process of recovering pure alumina from bauxite, which consists in digesting the material in dilute hydrochloric acid, drying and calcining the residue at red heat, digesting the mass in fuming hydrochloric acid, evaporating the solution, and calcining the residue of aluminum chloride to recover alumina.

In witness whereof, I have hereunto signed my name this 27th day of April, 1922, in the presence of two subscribing witnesses.

A. PEDEMONTE.

Witnesses:
ALEXANDER P. CRUGER,
EUGÈNE LEFEBVRED.